United States Patent [19]

Stolzman

[11] Patent Number: 5,160,061

[45] Date of Patent: Nov. 3, 1992

[54] PLASTIC AND FIBER CONTAINER

[76] Inventor: Michael D. Stolzman, 1188 Old Colony Rd., Lake Forest, Ill. 60045

[21] Appl. No.: 863,101

[22] Filed: Apr. 3, 1992

Related U.S. Application Data

[63] Continuation-in-part of Ser. No. 773,703, Oct. 9, 1991.

[51] Int. Cl.⁵ .............................................. B65D 41/00
[52] U.S. Cl. ................................... 220/359; 220/613; 220/634; 229/5.5; 156/69; 156/73.6; 493/118
[58] Field of Search ............... 220/359, 612, 613, 634, 220/643; 156/69, 73.6; 493/94, 95, 118; 229/4.5, 5.5

[56] References Cited

U.S. PATENT DOCUMENTS

| | | | |
|---|---|---|---|
| 3,899,117 | 8/1975 | Peyser et al. | 229/5.5 |
| 4,201,306 | 5/1980 | Dubois et al. | 156/69 X |
| 4,531,930 | 7/1985 | Clauss | 493/108 |
| 4,852,792 | 8/1989 | Hale | 229/5.5 |
| 5,025,982 | 6/1991 | Lisiecki | 220/359 X |
| 5,083,995 | 1/1992 | Gordon et al. | 493/94 |

Primary Examiner—Stephen Marcus
Assistant Examiner—Nova Stucker
Attorney, Agent, or Firm—Wood, Phillips, Van Santen, Hoffman & Ertel

[57] ABSTRACT

A container disclosed herein comprises a tubular sidewall defining a peripherally enclosed space, the sidewall having an annular end portion defining an open end of the space. The end portion is provided with through openings spaced circumferentially about the open end. A closure of synthetic resin comprises a U-shaped annular connecting ring having opposed, facing walls and a turned connecting wall extending therebetween to define an annular channel. The channel receives the sidewall end portion, one of the walls including a plurality of blocks of synthetic resin integrally formed therewith and spaced circumferentially about the one wall facing the other wall and of a size corresponding to a size of the sidewall through openings to be received therein. The sidewall is secured to the closure by vibrationally welding the connecting portion other wall to the blocks.

9 Claims, 2 Drawing Sheets

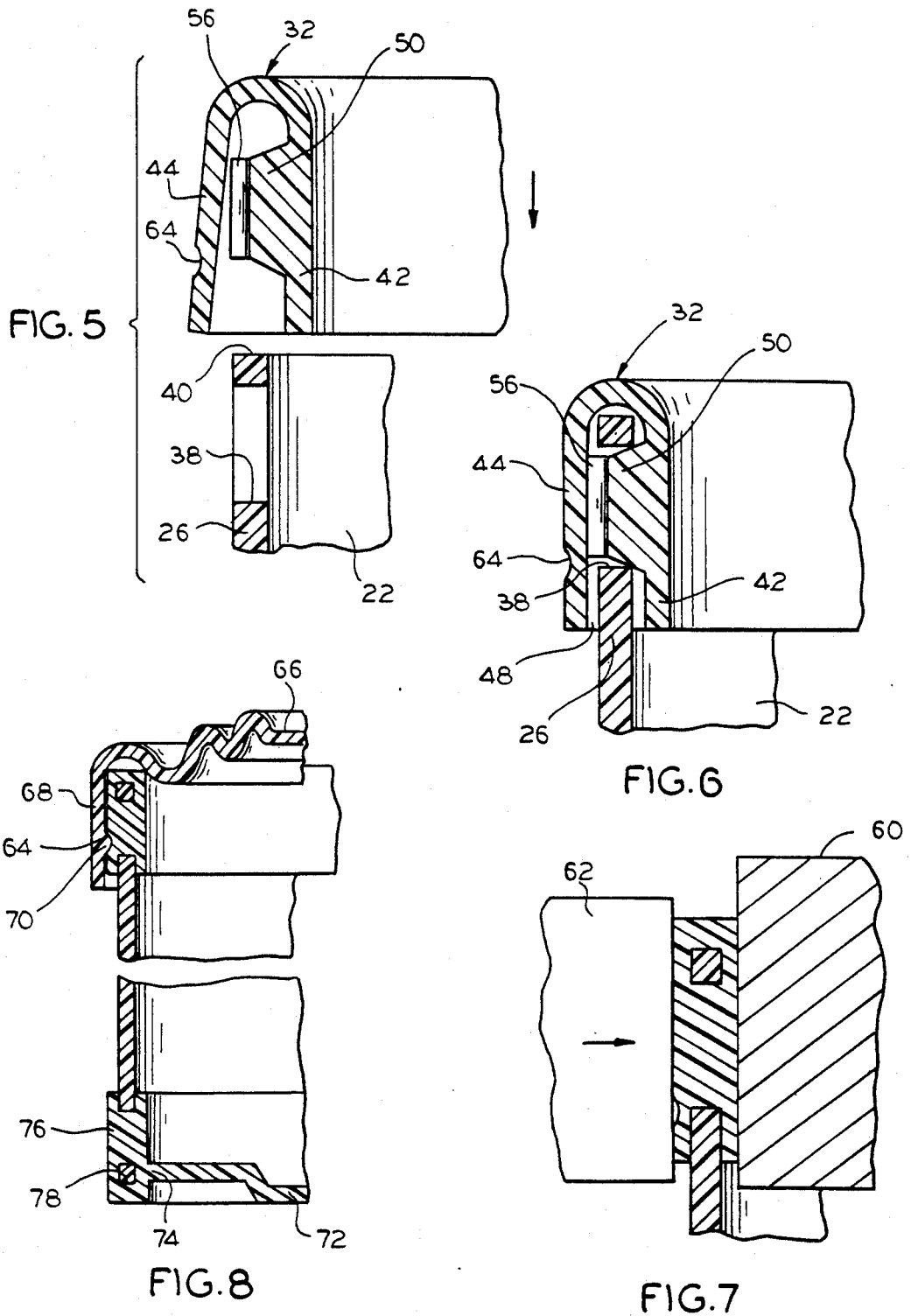

PLASTIC AND FIBER CONTAINER

CROSS-REFERENCE

This application is a continuation in part application of my application Ser. No. 773,703, filed on Oct. 9, 1991.

FIELD OF THE INVENTION

This invention relates to containers and, more particularly, to a plastic and fiber container.

BACKGROUND OF THE INVENTION

In one form of conventional shipping and storage container, a tubular sidewall is formed of fibrous material or other material. Conventionally, metal retaining rings are provided at opposite ends of the sidewall for securing closure walls there across. Such metal retaining rings are relatively costly and heavy and are not fully satisfactory in the formation of a low cost shipping and storage container.

Ultimately, the container may be sent to, for example, an incinerator for destruction. If a metal retaining ring is used, then it is necessary to remove the metal from the incinerator.

Further, in the formation of such a prior container, a rolling operation is required to seal the retaining ring to the drum.

An alternative to such prior containers is described in my U.S. Pat. No. 4,805,798, which discloses a container in the form of a tubular fiber sidewall having a connecting ring molded of synthetic resin in situ in association with an end portion of the sidewall. Such a container requires a die press adapted to support the sidewall while molding the connecting ring to the sidewall.

The present invention is directed to solving one or more of the problems discussed above in a novel and simple manner.

SUMMARY OF THE INVENTION

In accordance with the invention, there is disclosed a closure adhered to a container sidewall by vibrational welding.

Broadly, there is disclosed a container comprising a tubular sidewall defining a peripherally enclosed space, the sidewall having an annular end portion defining an open end of the space. The end portion is provided with through openings spaced circumferentially about the open end. A closure of synthetic resin comprises a U-shaped annular connecting ring having opposed, facing walls and a turned connecting wall extending therebetween to define an annular channel. The channel receives the sidewall end portion, one of the walls including a plurality of blocks of synthetic resin integrally formed therewith and spaced circumferentially about the one wall facing the other wall and of a size and shape corresponding to a size and shape of the sidewall through openings to be received therein. Means are provided for securing the sidewall to the closure by vibrationally welding the other wall to the blocks.

In accordance with one aspect of the invention, the closure has a transverse center wall closing the end of the space and connected at its peripheral edge to the connecting ring.

It is a feature of the invention that the openings are spaced equidistantly from a distal end of the sidewall end portion.

It is another feature of the invention that the blocks comprise generally planar blocks having a plurality of raised portions to facilitate vibrational welding.

It is still another feature of the invention that the blocks comprise generally planar blocks having a plurality of raised ridges to facilitate vibrational welding.

It is still another feature of the invention that the securing means secures the sidewall to the closure by ultrasonically welding the blocks into the other wall.

There is further disclosed herein a method of assembling a container, which comprises providing a tubular sidewall open at one end and including a plurality of circumferentially spaced openings through the sidewall proximate the open end, inserting the open end of the tubular sidewall into an annular channel of a U-shaped annular chime of synthetic resin having opposed, facing walls and a turned connecting wall extending therebetween defining said channel, one of the walls including a plurality of blocks of synthetic resin integrally formed therewith and spaced circumferentially about the one wall facing the other wall and of a size and shape corresponding to a size and shape of the sidewall through openings so that each said block is received in one through opening, and vibrationally welding the other channel wall to the blocks to secure the sidewall to the closure.

In the illustrated embodiment, the closure may take one of two forms and is formed of a molded synthetic resin. In one form, the closure includes a transverse center wall connected at its peripheral ridge to a connecting ring. In another form, the closure comprises a connecting ring vibrationally welded to the sidewall. The connecting ring is used in connection with a removable cover for closing the one end of the tubular sidewall. The connecting ring includes a radially outwardly opening annular recess and the closure is removably mounted to the connecting ring by a portion thereof removably interlocked with the connecting ring in the recess.

Further features and advantages of the invention will readily be apparent from the specification and from the drawings.

BRIEF DESCRIPTION OF THE DRAWING

FIG. 5 is a sectional, exploded view illustrating insertion of the sidewall into a connecting ring channel;

FIG. 6 is a sectional view showing the sidewall inserted in the connecting ring channel;

FIG. 7 is a sectional view illustrating the securing of the sidewall to the connecting ring as by vibrational welding; and FIG. 8 is a partial, sectional view illustrating the fully assembled container according to the invention.

DETAILED DESCRIPTION OF THE INVENTION

Figure 1:
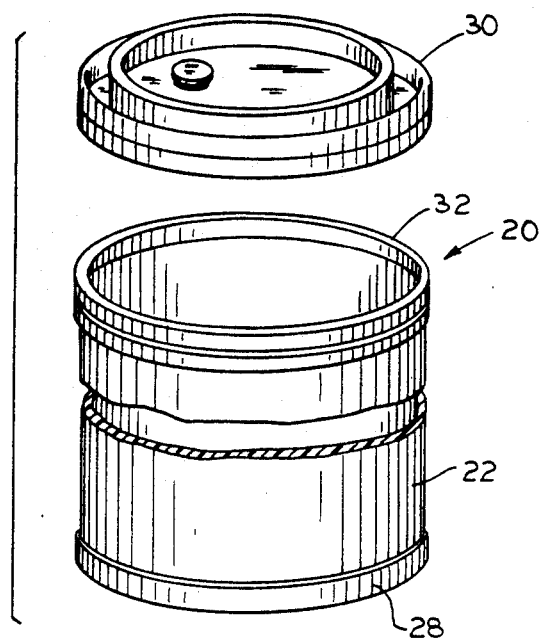
FIG. 1 is a partial, exploded view of a container in the form of a fiber and plastic drum in accordance with the invention.

As illustrated in the drawing, a container 20 includes a fibrous tubular sidewall 22. The sidewall 22 defines a right cylinder, it being understood that the sidewall 22 may define other suitable configurations, such as square, oval, etc.

Figure 2:
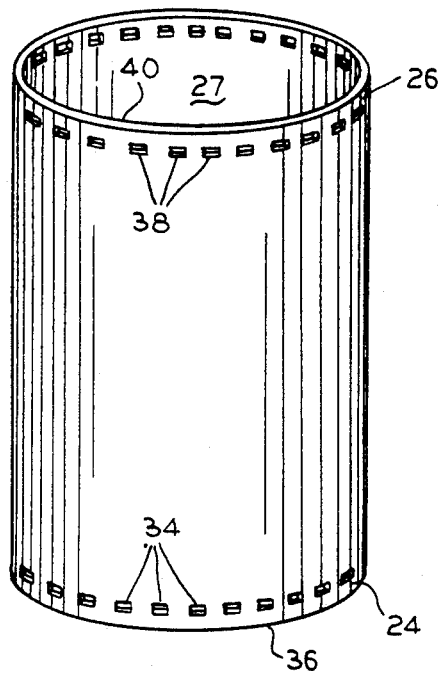
FIG. 2 is a perspective view of a tubular sidewall for the container of FIG. 1.

With reference also to FIG. 2, the sidewall 22 includes a lower end portion 24 and an upper end portion 26 and defines an internal storage space 27. The space 27 is closed at a lower end by a bottom closure 28 fixedly secured to the sidewall lower end portion 24, as seen in FIG. 1. The upper end of the space 27 is selectively closed by a second closure comprising a cover 30 removably secured to a chime or connecting ring 32 fixedly secured to the sidewall upper end portion 26.

As seen in FIG. 2, the sidewall lower end portion 24 is provided with an array of through openings 34 adjacent a distal edge 36 thereof. The openings 34 are square in shape and are equidistantly circumferentially spaced about the side lower end portion 24.

Similarly, the sidewall upper end portion 26 is provided with an array of through openings 38 adjacent a distal edge 40 thereof. The openings 38 are equidistantly circumferentially spaced about the sidewall upper end portion 26.

The openings 34 and 38 may be on the order of, for example, one inch square and spaced one inch apart. Further, the openings 34 and 38 may be on the order of ¼ inch spaced from the respective distal edge 36 and 40.

Figure 3:
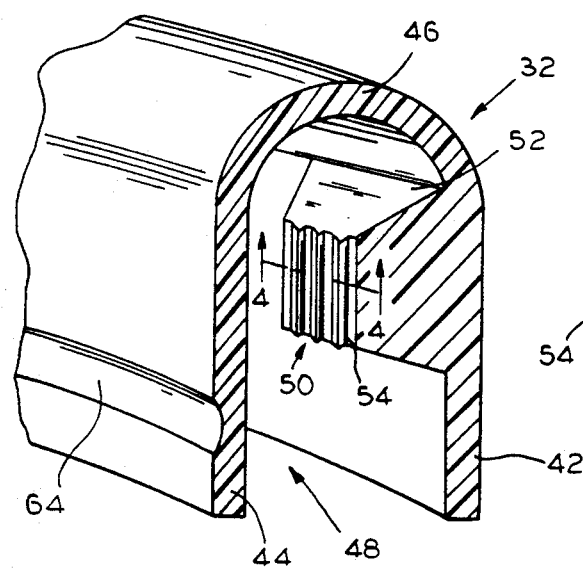
FIG. 3 is a sectional, partial, perspective view illustrating a connecting ring having an integral connecting block insertable into a through opening in the sidewall of FIG. 2.
Figure 4:
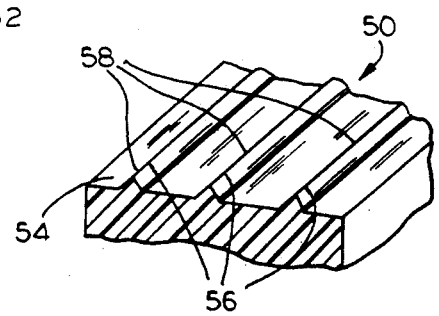
FIG. 4 is a sectional view taken along the line 4—4 of FIG. 3.

With reference to FIGS. 1 and 3, the connecting ring 32 is a unitary structure molded of a suitable synthetic resin, such as high density polyethylene. The connecting ring 32 is a U-shaped in cross section having an inside wall 42 and a coaxial, facing outer wall 44 connected by a turned arcuate upper wall 46 to define an annular, downwardly opening channel 48. The connecting ring 32 is of a size so that the sidewall upper end portion 26 is receivable in the channel 48 with the connecting ring 32 entirely covering the through openings 38, as illustrated in FIG. 6. Particularly, in the exemplary embodiment the depth of the channel 48 is at least 1¼ inches to account for the one inch square opening 38 being spaced ¼ inch from the distal edge 40.

To secure the connecting ring 32 to the sidewall upper end portion 26, a plurality of connecting blocks 50, one for each opening 38, are formed integrally with the inside wall 42 in the channel 48. The blocks 50 are formed of synthetic resin as is the ring 32. The spacing between blocks 50 is the same as between the openings 38. Each connecting block 50 is of a size corresponding to that of the openings 38. The blocks 50 are shaped as a frusto-pyramid with an enlarged base 52 joined to the wall 42. In the illustrated embodiment, each block 50 is approximately one inch square at the base 52 with a thickness corresponding to the thickness of the sidewall 22. Each block 50 includes a planar face 54 having three parallel elongate ridges 56. Each ridge 56 may be on the order of 0.025 inches in height with the distal edge 58 of each ridge defining a right angle.

To install the connecting ring 32 on the sidewall 22, the sidewall upper end portion 26 is inserted into the connecting ring channel 48. Particularly, the outside wall 44 and inside wall 42 are relatively deformed, as shown in FIG. 5, to enable the blocks 50 to pass over the wall edge 40. Each block 50 is received in an opening 38, see FIG. 6. The blocks 50 are entirely covered within the channel 48. The walls 42 and 44 then return to the normal orientation, generally parallel to one another. With each block 50 in an opening 38, the connecting ring 32 is loosely retained on the sidewall 22.

The connecting ring 32 is secured to the sidewall 26 by vibrationally welding the blocks 50 to the connecting ring outer wall 44 in the channel 48. Particularly, the sidewall 26 is placed over a cylindrical fixture 60, see FIG. 7, which provides a backing against the connecting ring 32. A sonic welding apparatus 62 is placed against the connecting ring 32 opposite the fixture 60 to sonically weld each block 50 to the connecting ring outside wall 44 to provide a complete mechanical connection without use of adhesives or the like. Particularly, the welding apparatus 62 is vibrated at ultrasonic frequencies transferred to the connecting ring 32. The vibrations are transmitted through the connecting ring outer wall 44 to the joint area with the block 50 where it is converted to heat through friction that melts the plastic. Initially, the ridge edges 58 concentrate the energy to rapidly initiate the softening and melting of the joining surface. This provides rapid welding while achieving maximum strength. After welding, the parts become integral such that the block 50 connects the opposite walls 42 and 44 of the connecting ring 32 through the openings 38, as particularly illustrated in FIG. 7.

The connecting ring 32 further includes a peripheral, radially outwardly opening annular recess 64. The cover 30 includes a transverse center wall 66 and a peripheral depending wall 68. The wall 68 includes a radially inwardly projecting flange 70 receivable in the connecting ring recess 64 to be retained thereon, see FIG. 8.

The bottom closure 28 comprises a unitary element molded of a suitable synthetic resin, such as high density polyethylene. The closure 28 comprises a transverse center wall 72 connected at its peripheral edge 74 to a connecting ring 76. The connecting ring 76 is similar to the connecting ring 32, discussed above, i.e. has a U-shaped annular configuration The bottom closure 28 is secured to the sidewall 22 similar to the connecting ring 32. Particularly, a plurality of plastic blocks, not shown are molded in a channel 78 of the connecting ring 76 to be received in the openings 34. The sidewall lower end portion 24 is then inserted into the channel 78. Although not specifically illustrated, the blocks are vibrationally welded at ultrasonic frequencies to the connecting ring 76, as discussed above to provide a securement as illustrated in FIG. 8.

Thus, in accordance with the invention, a container 20 is provided consisting of two component elements, namely plastic and fiber. After the container 20 has completed its useful life, the plastic and fiber parts can be separated and recycled, as necessary. No rolling operation is required to connect a metal ring to the container 20, and no metal remains at the completion of the useful life of the container 20.

The container 20 provides positive securement of the closures 32 and 28 to the sidewall 22 without having to mold the same directly thereon. Moreover, this such securement is accomplished without the use of a glue or other type of adhesive. Such a connection does not loosen at high temperatures, such as can happen with glue, is not messy or toxic such as certain glues, and does not react with the contents stored in the space 28.

The disclosed embodiment of the invention is illustrative of the broad inventive concepts comprehended.

I claim:

1. A container comprising:
   a cylindrical sidewall defining a peripherally enclosed space, said sidewall having an annular end portion defining an open end of said space, said end portion being provided with through openings spaced circumferentially about said open end;
   a closure member of synthetic resin comprising a U-shaped annular connecting portion having opposed, facing walls and a turned connecting wall extending therebetween, said connecting portion receiving said outer sidewall end portion between said walls, one of said walls including a plurality of blocks of synthetic resin integrally formed therewith and spaced cicumferentially about the one wall facing the other wall and of a size and shape corresponding to a size and shape of the sidewall through openings to be received therein; and
   means for securing said connecting ring to said sidewall by vibrationally welding said other wall to said blocks.

2. The container of claim 1 wherein said closure has a transverse center wall closing said end of said space and connected at its peripheral edge to said connecting portion.

3. The container of claim 1 wherein said openings are spaced equidistantly from a distal end of said sidewall end portion.

4. The container of claim 1 wherein said blocks have a plurality of raised portions to facilitate vibrational welding to said other wall.

5. The container of claim 1 wherein said blocks have a plurality of raised ridges on opposite sides to facilitate vibrational welding to said sidewall.

6. The container of claim 1 wherein said securing means secures said sidewall to said closure by ultrasonically welding said blocks into said other wall.

7. The container of claim 1 wherein said sidewall comprises a fibrous tubular sidewall.

8. A method of assembling a drum, which comprises:
   providing a tubular sidewall open at one end and including a plurality of circumferentially spaced openings through the sidewall proximate the open end;
   inserting the open end of the tubular sidewall into an annular channel of a U-shaped annular connecting portion of synthetic resin having opposed, facing walls and a turned connecting wall extending therebetween defining said channel, one of said walls including a plurality of blocks of synthetic resin integrally formed therewith and spaced circumferentially about the one wall facing the other wall and of a size corresponding to a size of the sidewall through openings so that each said block is received in one said through opening; and
   vibrationally welding said closure other wall to said blocks to secure said sidewall to said connecting portion.

9. The method of claim 8 wherein said vibrationally welding step comprises inserting a cylindrical fixture into said sidewall against said connecting portion and positioning a vibrating element against said connecting portion to transmit vibrations through the connecting portion to join the blocks to the other wall in the channel.

* * * * *